(12) United States Patent
Kikuchi et al.

(10) Patent No.: US 6,570,828 B2
(45) Date of Patent: May 27, 2003

(54) OPTICAL PICKUP DEVICE HAVING A MOVABLE-SIDE MEMBER DRIVEN WITH A PREDETERMINED INCLINATION

(75) Inventors: Nobuyasu Kikuchi, Chiba (JP); Akio Yamakawa, Tokyo (JP); Yusaku Seki, Kanagawa (JP); Tetsuo Maeda, Tokyo (JP); Yutaka Sugawara, Tokyo (JP)

(73) Assignee: Sony Corporation (JP)

( * ) Notice: Subject to any disclaimer, the term of this patent is extended or adjusted under 35 U.S.C. 154(b) by 57 days.

(21) Appl. No.: 09/842,868

(22) Filed: Apr. 27, 2001

(65) Prior Publication Data

US 2002/0176348 A1 Nov. 28, 2002

(30) Foreign Application Priority Data

May 1, 2000 (JP) ........................................ 2000-132489

(51) Int. Cl.[7] .................................................. G11B 7/00
(52) U.S. Cl. .................................. 369/44.32; 369/53.19
(58) Field of Search .......................... 369/44.15, 44.16, 369/44.32, 53.19, 44.14, 112.23

(56) References Cited

U.S. PATENT DOCUMENTS 6,134,058 A * 10/2000 Mohri et al. ............. 369/44.15

* cited by examiner

Primary Examiner—Paul W. Huber
(74) Attorney, Agent, or Firm—Rader, Fishman & Grauer PLLC; Ronald P. Kananen, Esq.

(57) ABSTRACT

A skew of an optical pickup device can be adjusted by a movable-side member itself which holds thereon an objective lens. A holder which holds an objective lens is supported by four spring wires such that it can be moved in the focusing direction and the tracking direction of an optical disk. A center of a magnetic circuit which drives the holder is shifted in the outer peripheral side relative to the optical disk. Elastic force of the spring wires of the inner peripheral side is suppressed by increasing the amount of a gel material bonded to the spring wires located on the inner peripheral side of the optical disk as a damping material as compared with the amount of the gel material bonded to the spring wires located on the outer peripheral side. Thus, the holder can be driven by a predetermined inclination in the focusing direction such that the optical axis of the objective lens becomes substantially perpendicular to the signal recording surface of the optical disk in response to the focus height changed due to the skew of the optical disk.

8 Claims, 13 Drawing Sheets

FIG. 9

| Position | Rad. Skew(deg.) Measured | Difference From Rad. Skew Standard | Tan. Skew(deg.) Measured |
|---|---|---|---|
| 1 | -0.40 | 0.00 | -0.02 |
| 2 | -0.40 | 0.00 | -0.03 |
| 3 | -0.01 | -0.01 | 0.00 |
| 4 | 0.38 | -0.02 | 0.01 |
| 5 | 0.38 | -0.02 | 0.01 |
| 6 | 0.36 | -0.04 | 0.00 |
| 7 | 0.01 | 0.01 | 0.00 |
| 8 | -0.33 | 0.07 | -0.02 |

OPTICAL PICKUP DEVICE HAVING A MOVABLE-SIDE MEMBER DRIVEN WITH A PREDETERMINED INCLINATION

BACKGROUND OF THE INVENTION

1. Field of the Invention

The present invention: relates to an optical pickup device or use with an optical disk apparatus for recording and/or reproducing an optical disk which is a disk-like optical recording medium such as an optical disk and a magneto-optical disk.

2. Description of the Related Art

Optical pickup devices are generally for use with an optical disk apparatus. An optical disk apparatus, such as a CD player and a DVD player for reproducing an optical disk, includes an optical pickup device alone, and a magneto-optical disk apparatus for recording and/or reproducing a magneto-optical disk includes an optical pickup device combined with a magnetic head device serving as an overwrite head.

While this optical pickup device is able to read out a signal from an optical disk by irradiating laser beams on the optical disk, if the optical disk is encountered with a trouble such as a skew, then a laser beam irradiated from an objective lens is focused on a signal surface with an inclination. As a result, a focus of a laser beam is spread as an elliptical focus and reading of a signal becomes indefinite due to a crosstalk so that a picture quality is deteriorated when a video signal is read out from the signal surface.

For this reason, since laser beams should constantly be irradiated on the optical disk perpendicularly in order to accurately read out a signal from the optical disk, the optical pickup device detects a disk skew so as to constantly read a recorded signal with the best optical aberration state relative to the skew of the optical disk and reads (reproduces) a recorded signal by mechanically inclining the optical pickup device itself, i.e., adjusts a skew based on a detected signal.

As an optical disk apparatus in which the disk skew is detected and the optical disk is reproduced while the optical pickup device itself is being inclined mechanically, there is known an optical disk apparatus in which a mechanical chassis includes a pickup chassis having an optical pickup device which is driven with an inclination independently of a disk drive chassis including a spindle motor and a turntable, a sensor for detecting an inclination of a disk is disposed on this pickup chassis, this sensor detects an inclination of a disk surface relative to the optical axis of the optical pickup device and skew servo for adjusting an angle of the optical axis of the optical pickup device is effected by driving the pickup chassis with an inclination in accordance with the detected inclination.

In recent years, there has been sued an optical disk apparatus including an optical pickup device which introduces skew servo to calculate an optical jitter value by directly monitoring a jitter value of an RF signal of an optical pickup device without the sensor for detecting the inclination of the optical disk.

As the optical disk apparatus including the above optical pickup device, there is proposed an optical disk apparatus as shown in FIGS. 15 to 18.

A base chassis 2 of an optical disk apparatus 1 shown in FIGS. 15 to 18 is comprised of a spindle chassis 4 including a rotary drive mechanism 3 for rotating an optical disk D and a pickup chassis 6 including an optical pickup device 5 for reading out an information recording signal from the optical disk D rotated by the rotary drive mechanism 3 in such a manner that the optical pickup device can be moved.

The spindle chassis 4 is shaped as a substantially rectangular frame-like chassis. A front side portion 4a which is one end side of the longitudinal direction is substantially twice as high as other three side portions. Its top surface is inwardly extended and its central portion is protruded in the upper direction, thereby providing a motor attachment base 7. A spindle motor 8 is attached to the lower surface side of this motor attachment base 7. A rotary shaft 8a of this spindle motor is protruded to the upper surface side of the motor attachment base 7, and a turntable 9 is fitted into and fixed to the protruded end of the rotary shaft at a fitting portion 9a of the central portion. The spindle motor 8 and the turntable 9 constitute the rotary drive mechanism 3.

On the other hand, the pickup chassis 6 is substantially the same in shape as the three-side portion without the front side portion 4a of the spindle chassis 4, i.e., substantially U-letter shape of substantially the same size when viewed from a plan, and a coupling member 6a is extended between the front ends of the pickup chassis. This pickup chassis 6 is disposed on the spindle chassis 4 behind the front side portion 4a. In the inside of one side portion 6b of this pickup chassis 6, there is extended a feed screw shaft 10 of the optical pickup device 5 in the front and back direction so that the feed screw shaft may be pivotally supported at the front and rear ends. The feed screw shaft is coupled at its front end to a feed motor 11 attached to the front end face of the one side portion 6b.

In the inside of another side portion 6c of the pickup chassis 6, there is extended a guide shaft 12 in parallel to the feed screw shaft 10. A cam member 13 is protruded from the upper front end of another side portion 6c. Shaft portions 14a, 14b are protruded from the lower sides of substantially the central portions of the outside of the two side portions 6b, 6c of this pickup chassis 6 and pivoted at bearing portions 15a, 15b provided at substantially the central portions of the two side portions 4b, 4c of the spindle chassis 4. While the shaft portions 14a, 14b of the pickup chassis 6 are being pivoted at the bearing portions 15a, 15b of the spindle chassis 4, a predetermined space is generated between the lower surface side of the pickup chassis and the upper surface side of the three-side portion of the spindle chassis 4.

The pickup chassis 6 pivotally disposed on the spindle chassis 4 as described above includes the optical pickup device 5 in such a manner that the optical pickup device can be moved close to or moved away from the disk rotary drive mechanism 3 attached to the front side portion 4a of the spindle chassis 4. Specifically, this optical pickup device 5 includes a slide member 17 with a biaxial actuator 16 for driving an objective lens 5a mounted thereon and which incorporates therein optical assemblies (not shown). This slide member 17 has a bearing aperture 17a defined at its one side. The feed screw shaft 10 at the one side portion 6b side of the pickup chassis 6 is inserted into this bearing aperture 17a so as to become freely slidable. A slide rack 18 attached to the lower surface of the slide member 17 is meshed with this feed screw shaft 10. A bearing portion of substantially U-letter shape is provided on the other side of the slide member 17 and tightly inserted into the guide shaft 12 on another side portion 6c of the pickup chassis 6 so as to become freely slidable. In this manner, the slide member 17 is supported by the feed screw shaft 10 and the guide shaft 12 and transported by a transport drive mechanism comprised of the feed screw shaft 10, the feed motor 11 and the slide rack 18, whereby the optical pickup device 5 is moved close to or moved away from the disk rotary drive mechanism 3.

Then, the pickup chassis 6 including this optical pickup device 5 is constantly displaced toward the other side portion 4c side with elasticity relative to the spindle chassis 4 and is tilted by a tilt drive mechanism 19. This tilt drive mechanism 19 is attached to the front side portion 4a of the spindle chassis 4 and is comprised of a tilt motor 20 attached to the lower surface side of the front side portion 4a, a tilt gear 21 fitted into and fixed to a rotary shaft of the tilt motor 20 protruded to the upper surface side and a tilt cam 22 pivotally supported to the upper surface side so as to be meshed with the teeth portion of the tilt gear 21 and which has a cam surface 22a formed on its upper end face.

A cam member 13 on the other side portion 6c of the pickup chassis 6 is opposed to the cam surface 22a of the tilt cam 22 of this tilt drive mechanism 19. A free end side of a leaf spring 24 fastened to and fixed to the upper surface of the front side portion 4a of the spindle chassis 4 by a fixing screw 23 is urged against the cam member 13 at its base end portion, whereby the cam member 13 is constantly urged against the cam surface of the tilt cam 22 under spring force of the leaf spring 24. In FIG. 15, reference numeral 25 denotes an actuator cover which covers the biaxial actuator 16 of the optical pickup device 5. This actuator cover has an opening 25a defined thereon to expose the objective lens 5a.

In the disk drive apparatus 1 having the above arrangement, the optical disk D is held on and chucked to the turntable 9 of the disk rotary drive mechanism 3 and the turntable 9 is rotated by the spindle motor 8, whereby the optical disk D is rotated at a predetermined velocity.

At substantially the same time this optical disk D is rotated, the feed motor 11 of the feed mechanism of the optical pickup device 5 is driven and thereby the feed screw shaft 10 is rotated. Consequently, the slide member 17 is slid along the feed screw shaft 10 and the guide shaft 12 through the slide rack 18 meshed with the feed screw shaft 10, whereby the optical pickup device 5 is moved, i.e., moved in the direction in which the optical pickup device approaches to the turntable 9. The inclination of the disk D on the turntable 9 is detected by the movement of this optical pickup device 5.

The manner in which the inclination of the optical disk D is detected will be described below. When the optical pickup device 5 is moved in the radius direction from the outer peripheral side to the inner peripheral side of the optical disk D, time periods required until laser beams are returned after the laser beams have been irradiated on the information recording surface of the optical disk D from the objective lens 5a are detected continuously. Thus, it is possible to detect the inclination amount of the optical disk D by comparing the time periods thus detected.

Operations for correcting the thus detected inclination amount of the optical disk D will be described below. Assuming that the spindle chassis 4 and the pickup chassis 6 comprising the base chassis 2 are set to the relationship shown in FIG. 17, for example, i.e., the pickup chassis 6 is inclined toward the turntable 9 side relative to the spindle chassis 4, then when the inclination of the optical disk D is detected in this state, the tilt motor 20 is driven and rotation force of the tilt motor is transmitted to the tilt gear 21, whereby the tilt cam 22 meshed with this tilt gear 21 is rotated in response to a rotation amount of the tilt motor 20.

Since the cam member 13 of the pickup chassis 6 is urged against the cam surface 22a of the upper surface side of this tilt cam 22 under spring force of the leaf spring 24, the high portion surface of the cam surface 22a is brought in slidable contact with the cam member 13 by the rotation of the tilt cam 22 so that the pickup chassis 6 is pushed up through the cam member 13 and thereby rotated about the pivot portions based on the shaft portions 14a, 14b. Thus, when the highest position of the cam surface 22a of the tilt cam 22 is brought in a slidable contact with the cam member 13, the pickup chassis 6 is inclined rearwardly as shown in FIG. 18.

In this manner, the pickup chassis 67 is being inclined between the state shown in FIG. 17 and the state shown in FIG. 18, whereby the inclination of the optical pickup device 5 can be adjusted in response to the inclination of the optical disk 33 and the optical axis of the objective lens 5a can be opposed to the direction perpendicular to the information recording surface of the optical disk 33.

When the inclination of the optical pickup device 5 is adjusted in response to the inclination amount of the optical disk D by the adjustment of the tilt mechanism, the optical pickup device 5 reproduces an information signal from the information recording surface of the optical disk D. The manner in which the information recording signal is reproduced by this optical pickup device 5 will be described. Laser beams are irradiated on the information recording surface of the optical disk D from the objective lens 5a and reflected beams are received through the objective lens 5a, whereby the information signal is reproduced from that information recording surface.

As described above, in the disk drive apparatus 1, the optical pickup device 5 is incorporated in the pickup chassis 6 which is provided independently of the spindle chassis 4 including the disk rotary drive mechanism 3, this pickup chassis 6 is inclined by the tilt motor 20 and the tilt cam 22 of the spindle chassis 4, the posture of the optical pickup device 5 is corrected to the optical best point relative to the optical disk D rotated by the disk rotary drive mechanism 3, i.e., the jitter best point and the optical disk D is reproduced.

While the conventional optical pickup device of the optical disk apparatus such as a CD player and a DVD player is adapted to mechanically incline the optical pickup device itself in order that the information recording signal can constantly be read out under the optical best aberration state relative to the inclination of the rotating optical disk as described above, this optical pickup device having the arrangement in which the inclination of the optical disk is detected by a sensor or the like cannot be miniaturized without difficulty. Moreover, since this optical pickup device mechanically inclines itself, the arrangement becomes complicated and the number of assemblies increases, which as a result makes the optical pickup device expensive.

Also in the case of the optical pickup device in which the sensor for detecting the inclination of the optical disk or the like is deleted and which introduces the adaptive servo in which the optimum jitter value is calculated by directly monitoring the jitter value of the RF signal based on reflected beams from the optical disk, a mechanical mechanism such as the tilt mechanism for controlling the posture of the optical pickup device cannot be deleted, the arrangement thereof is complicated and the number of assemblies increases. This hinders the manufacturing cost from being decreased and also hinders the optical pickup device from being miniaturized.

SUMMARY OF THE INVENTION

In view of the aforesaid aspect, it is an object of the present invention to provide an optical pickup device for use in a disk drive apparatus in which an information recording signal can constantly be read out with the best optical aberration state relative to an inclination of an optical disk without using a mechanical tilt mechanism.

In order to attain the above objects, there is provided an optical pickup device including an objective lens drive mechanism comprising a movable-side member holding an objective lens for converging optical beams emitted from a light source on a signal recording surface of a disk-like optical recording medium, a supporting mechanism for supporting the movable-side member such that the movable-side member can be driven in the focusing direction and in the tracking direction relative to the disk-like optical recording medium and a drive force providing means for providing the movable-side member with driving force, wherein the movable-side member is driven with a predetermined inclination in the focusing direction in response to a focusing height changed due to a skew of the disk-like optical recording medium in such a manner that an optical axis direction of the objective lens becomes substantially perpendicular to the signal recording surface of the disk-like optical recording medium.

In the above arrangement, according to the present invention, the supporting mechanism is comprised of a fixed-side member and four supporting springs and spring constants of supporting springs located at the inner peripheral side of the disk-like optical recording medium are made larger than those of supporting springs located at the outer peripheral side so that the predetermined inclination is generated when the movable-side member is driven in the focusing direction.

In the above arrangement, the supporting springs make spring constants of supporting springs of the inner peripheral side become larger than those of supporting springs of the outer peripheral side by changing diameters of wires.

In the above arrangement, according to the present invention, the driving mechanism includes a magnetic circuit and a center of the magnetic circuit is shifted in the outer peripheral direction relative to the disk-like optical recording medium such that the predetermined inclination is generated when the movable-side member is driven in the focusing direction.

In the above arrangement, the magnetic circuit displaces its center in the outer peripheral side by increasing a space between a yoke fitted into a hollow portion of a focusing coil wound around the movable-side member in the inner peripheral side relative to the disk-like optical recording medium and by decreasing the space in the outer peripheral side relative to the disk-like optical recording medium.

In the above arrangement, according to the present invention, the driving mechanism includes a magnetic circuit, the magnetic circuit has a center shifted in the outer peripheral direction relative to the disk-like optical recording medium, the supporting mechanism is comprised of a fixed-side member and four supporting springs and the predetermined inclination is generated by suppressing elastic force of supporting springs located at the inner peripheral side relative to the disk-like optical recording medium when the movable member is driven in the focusing direction.

In the above arrangement, the magnetic circuit shifts its center in the outer peripheral side by increasing a space between a yoke fitted into a hollow portion of a focusing coil wound around the movable-side member and the focusing coil in the inner peripheral side relative to the disk-like optical recording medium and by decreasing the space in the outer peripheral side relative to the disk-like optical recording medium, the supporting mechanism includes four supporting springs to which damping materials are bonded and elastic force of supporting springs located at the inner peripheral side is suppressed by increasing an amount of damping materials of the supporting springs located at the inner peripheral side relative to the disk-like optical recording medium than that of damping materials of the supporting springs located at the outer peripheral side.

In the optical pickup device having the above arrangement according to the present invention, since the movable-side member holding the objective lens of the objective lens drive mechanism is driven with the predetermined inclination in the focusing direction in response to the amount in which the height of focus is changed due to the skew of the disk-like optical recording medium so that the Q axis of the objective lens becomes substantially perpendicular to the signal recording surface of the disk-like optical recording medium, the optical pickup device is able to reproduce the recorded signal reliability.

Then, according to the present invention, the tilt mechanism for detecting the skew of the disk-like optical recording medium and adjusting the tilt can be deleted from the optical pickup device, and hence the arrangement of the disk drive apparatus can be simplified.

BRIEF DESCRIPTION OF THE DRAWINGS

FIG. 7, including

FIG. 9 is a table showing measured values obtained at the skew measuring points shown in FIG. 8;

DESCRIPTION OF THE PREFERRED EMBODIMENTS

Embodiments of the present invention will be described below with reference to FIGS. 1 to 6.

Figure 1:
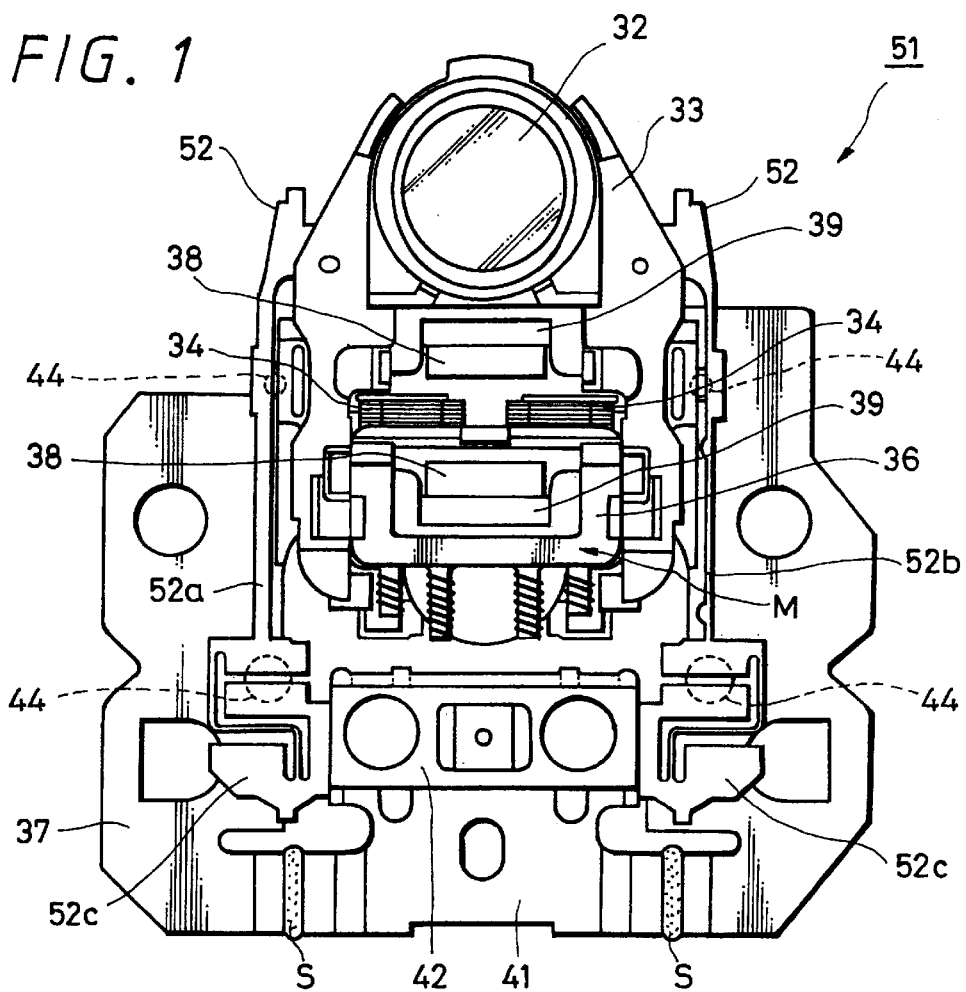
FIG. 1 is a plan view of a first example of a biaxial actuator used in the present invention.
Figure 2:
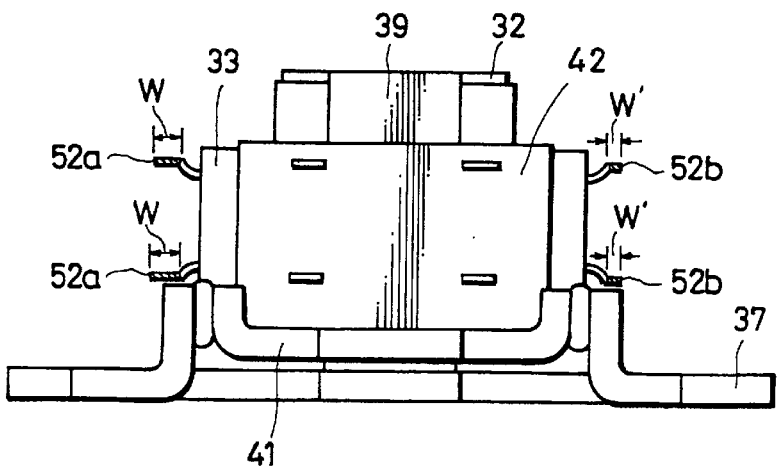
FIG. 2 is a partly cut-away rear view of the biaxial actuator shown in FIG. 1.
Figure 3:
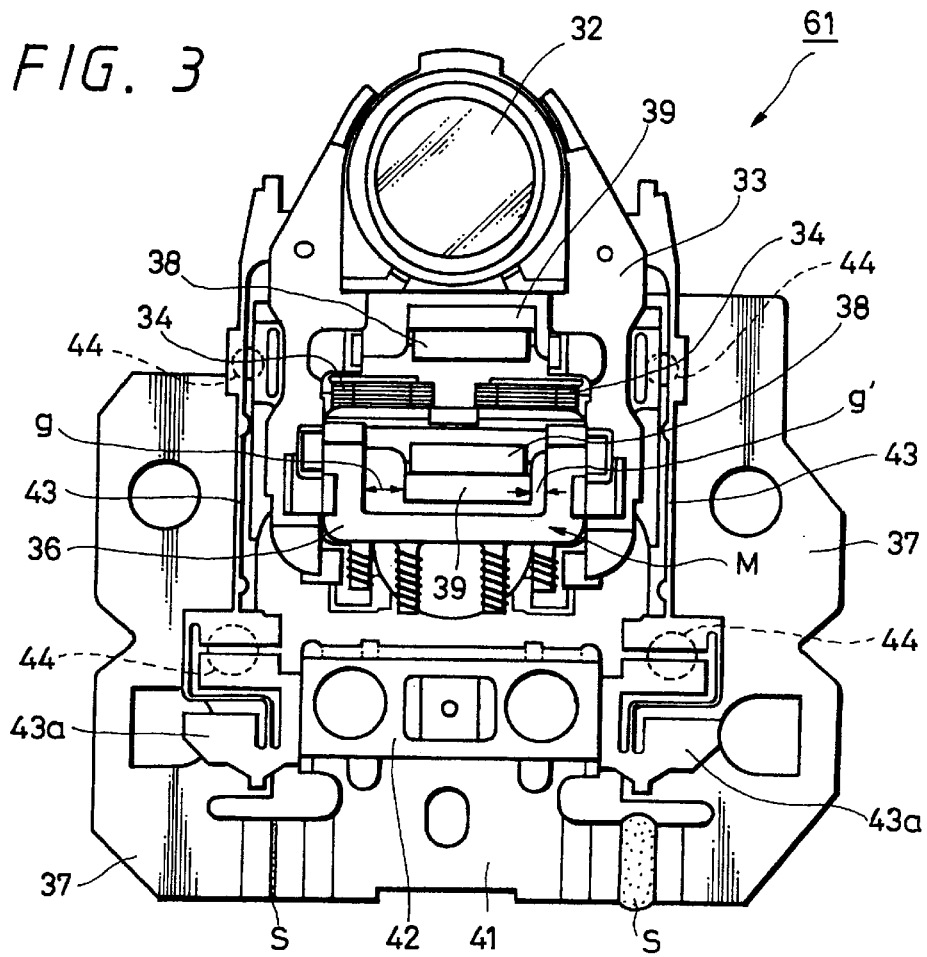
FIG. 3 is a plan view of a second example of a biaxial actuator used in the present invention.
Figure 4:
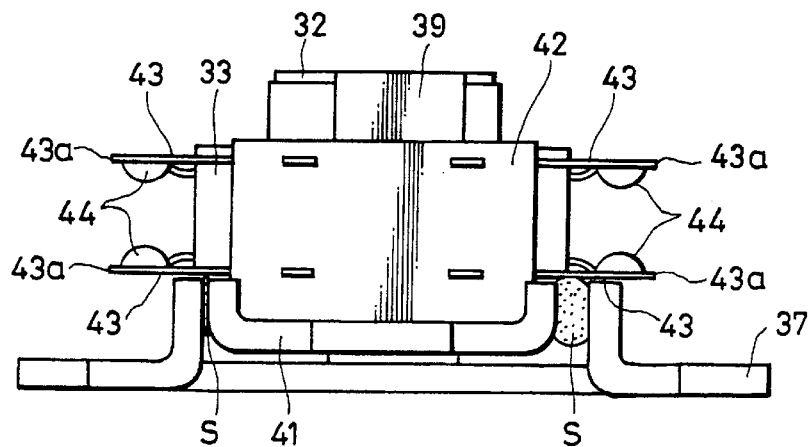
FIG. 4 is a rear view of the biaxial actuator shown in FIG. 3.
Figure 5:
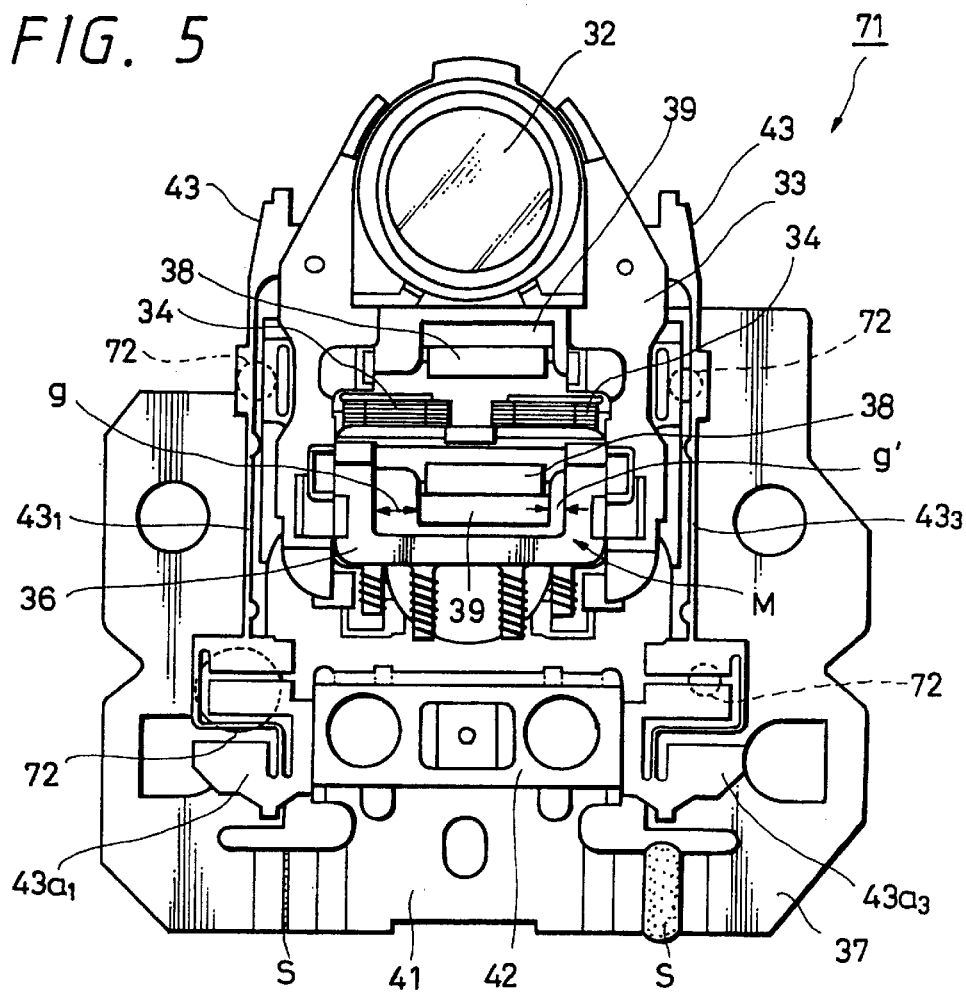
FIG. 5 is a plan view of a third example of a biaxial actuator used in the present invention.
Figure 6:
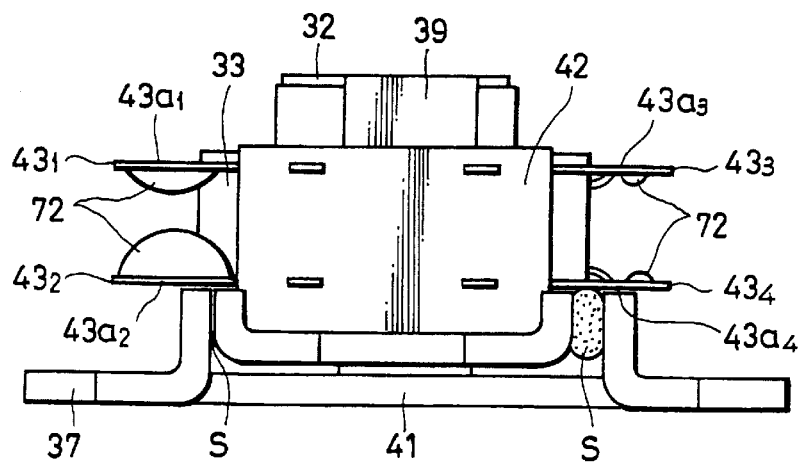
FIG. 6 is a rear view of the biaxial actuator shown in FIG. 5.

FIGS. 1 to 6 show respective examples of biaxial actuators which are objective lens drive mechanisms for driving an objective lens of an optical pickup device in a disk drive apparatus. FIG. 1 is a plan view of a biaxial actuator according to a first embodiment. FIG. 2 is a rear view showing the biaxial actuator in a partly cut-away fashion. FIG. 3 is a plan view of a biaxial actuator according to a second embodiment. FIG. 4 is a rear view thereof. FIG. 5 is a plan view of a biaxial actuator according to a third embodiment. FIG. 6 is a rear view thereof.

Prior to describing the biaxial actuators according to the first to third embodiments shown in FIGS. 1 to 6, a biaxial actuator according to the prior art will be described with reference to FIG. 14.

Figure 14:
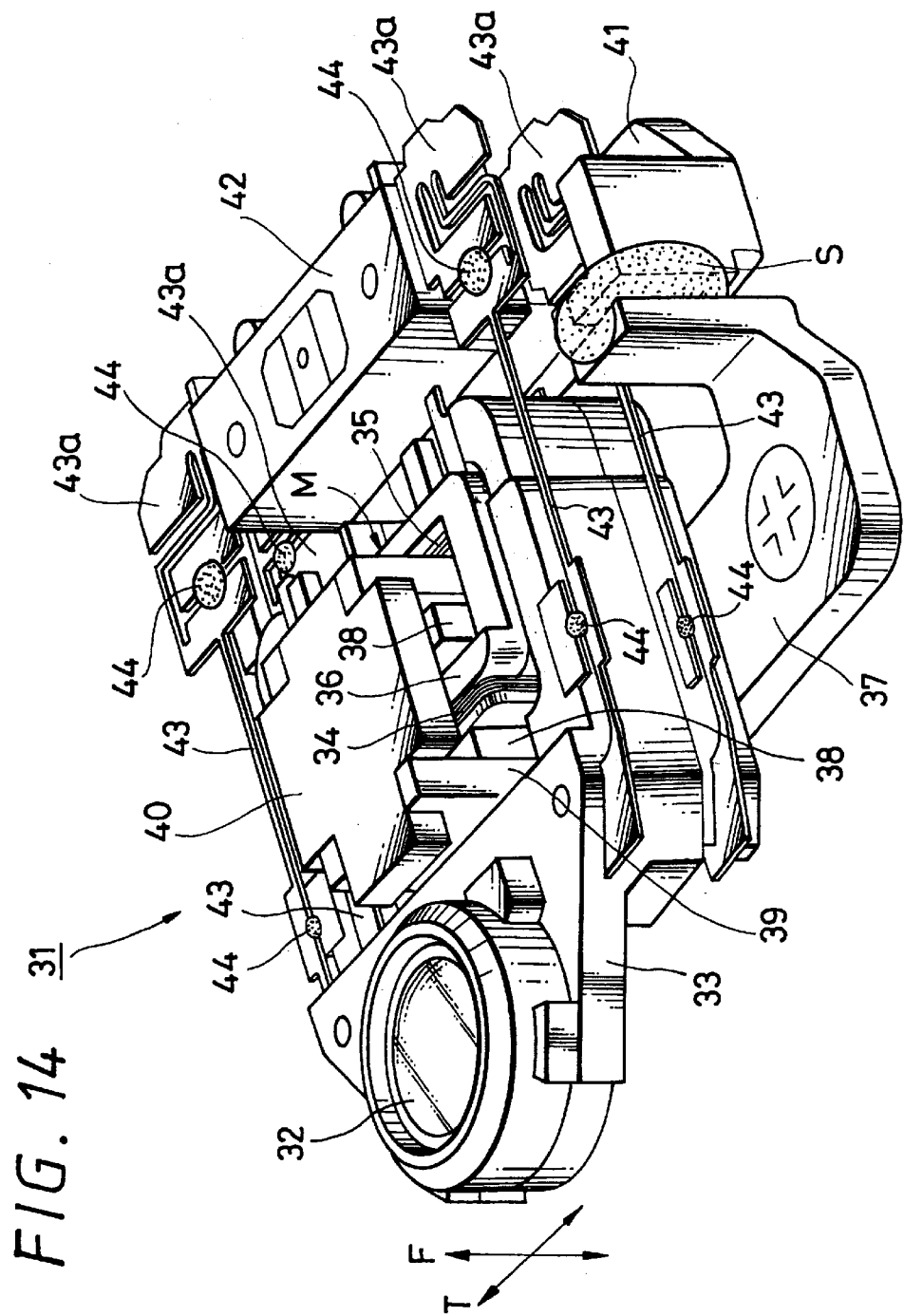
FIG. 14 is a perspective view of an example of a biaxial actuator according to the prior art.

In FIG. 14, reference numeral 31 designates a biaxial actuator which serves as an objective lens drive mechanism for supporting and driving an objective lens 32 for converging laser beams emitted from a laser light source on an optical disk serving as a disk-like optical recording medium. In this biaxial actuator 31, a tracking coil 34 for driving the objective lens 32 in the radius direction of the optical disk and a focusing coil 35 for driving the objective lens 32 in the optical axis direction are wound around a bobbin 36 and attached to a holder 33 serving as a movable-side member for holding the objective lens 32 thereon. This bobbin 36 is fitted into a main yoke 39 of substantially a U-shape comprising a yoke base 37 serving as an actuator base plate and magnets 38, 38 joined to the respective inner surfaces of the main yoke in such a manner that it can be moved in the axial direction and rotated in the axial direction. A plate-like sub-yoke 40 is fitted into and joined to a space between the tip ends of the main yoke 39 and thereby a magnetic circuit M is formed.

The sub-yoke 40 is shaped so as to cover the optical disk opposing surface which is the open end face of the main yoke 39. When this sub-yoke 40 is joined to the open end face of the main yoke 39, the sub-yoke is located in the direction substantially perpendicular to the magnetic flux direction of the magnets 38, 38 so that the upper portion side of the magnets 38, 38, i.e., the optical disk side is closed.

The holder 33 is supported to a biaxial support assembly 42 serving as a fixed-side member fixed to an adjustment plate 41 fixed to the yoke base 37 by a solder s by four spring wires 43, which are substantially parallel in the upper and lower direction and the lateral direction, fixed to a diaphragm spring portion 43a of a base end portion serving as a biaxial suspension in such a manner that it can be moved in the upper and lower direction and the lateral direction. Consequently, the objective lens 32 held on this holder 33 is moved in the focusing direction and the tracking direction relative to the optical disk. In FIG. 14, reference numeral 44 denotes a gel material serving as a damping material bonded to the spring wire 43.

In the biaxial actuator 31 having the above arrangement, a magnetic field formed by the magnetic circuit M is formed of a loop-like magnetic flux in which magnetic fields from the magnets 38, 38 are returned through a closed magnetic path formed by the main yoke 39 of substantially U-shaped cross-section and the sub-yoke 40 attached between the open tip ends of the main yoke to the magnets 38, 38. The tracking coil 34 and the focusing coil 35 attached to the older 33 through the bobbin 36 are located in this magnetic field.

Then, drive currents based on predetermined error signals obtained from optical detected signals detected by an optical detecting mechanism, not shown, are supplied to the two coils 34, 35. Specifically, a drive current based on a tracking error signals is supplied to the tracking coil 34, whereby the holder 33 with the objective lens 32 is linearly moved in the direction perpendicular to the optical axis of the objective lens 32 as shown by an arrow T in FIG. 14. Simultaneously, a drive current based on a focusing error signal is supplied to the focusing coil 35, whereby the holder 33 with the objective lens 32 is linearly moved in the optical axis of the objective lens 32 as shown by an arrow F in FIG. 14.

As described above, the biaxial actuator 31 moves the objective lends 32, whereby the focus of the laser beam is formed on the recording track by this objective lens 32 following the periodical movement of the recording track on the optical disk.

The biaxial actuator 31 having the above arrangement is used as the biaxial actuator of the optical pickup device of the aforementioned disk drive apparatus shown in FIGS. 15 to 18.

Next, biaxial actuators according to the embodiments of the present invention will be described. Elements and parts identical to those of the aforementioned biaxial actuator shown in FIG. 14 are marked with the identical reference numerals and therefore need not be described.

First, in a biaxial actuator 51 according to the first embodiment shown in FIGS. 1 and 2, a spring constant of a suspension itself for supporting the holder 33 which holds the objective lens 32 thereon is made different in the inner peripheral side and the outer peripheral side of the optical disk. Specifically, four spring wires 52 serving as suspensions for supporting the holder 33 in the biaxial actuator 51 increase diameters of upper and lower spring wires 52a, 52a on the inner peripheral side of the optical disk and decrease diameters of upper and lower spring wires 52b, 52 b on the outer peripheral side of the optical disk. In the illustrated example of the biaxial actuator, since the four spring wires 52 are formed of beryllium copper thin plates having elasticity, a relationship between a width w of the spring wires 52a, 52a of the inner peripheral side and a width w' of the spring wires 52b, 52b of the outer peripheral side is set to w>w' and spring constants of the spring wires 52a, 52a of the inner peripheral side are set to be larger than those of the spring wires 52b, 52b of the outer peripheral side. Respective base end portions of the four spring wires 52 (52a, 52a and 52b, 52b) are formed on the same diaphragm spring portion 52c.

In the biaxial actuator 51 according to the first embodiment, other members than the four spring wires 52 serving as the suspensions are similar to those of the biaxial actuator 31 shown in FIG. 14. Therefore, those members are marked with the same reference numerals and need not be described.

In the biaxial actuator 51 having the above arrangement according to the first embodiment, the drive current is supplied to the focusing coil 35 of the magnetic circuit M, whereby the holder 33 which holds the objective lens 32 is moved in the height direction. In the four spring wires 52 which support the holder 33, since the spring wires 52a, 52a of the inner peripheral side have the spring constants larger than those of the spring wires 52b, 52b of the outer peripheral side and have large spring force, the holder is not moved linearly and is inclined when it reaches a constant height.

Specifically, while the holder 33 is being moved in the upper direction, as shown in FIG. 7 which will be described later on, since the spring wires 52b, 52b of the outer peripheral side are small in spring constant and have small spring force, these spring wires are considerably deformed with elasticity in the upper direction by upward movement force of the holder 33 as compared with the spring wires 52a, 52a of the inner peripheral side, thereby resulting in the holder 33 being inclined in the inner peripheral direction.

In the state in which the holder 33 is moved in the lower direction, by the downward movement force of this holder 33, the spring wires 52b, 52b of the outer peripheral side are considerably deformed with elasticity in the lower direction as compared with the spring wires 52a, 52a of the inner peripheral side, whereby the holder 33 is inclined in the outer peripheral direction.

Accordingly, assuming that the optical disk rotated by the rotary drive mechanism has an inclination of ±0.5°, then the height change of about ±0.5° is generated in the outermost periphery of a 12 cm-disk. Therefore, when the optical pickup device focuses this optical disk as it is, the objective lens reads out a signal under the condition that its optical axis has a skew of ±0.5°. Consequently, the optical aberration is not matched with the jitter best point conditions, thereby causing a reproduced signal to be deteriorated. However, in the biaxial actuator 51 according to the first embodiment, since the holder 33 which holds the objective lens 32 is inclined in accordance with the height (focus) change by changing the spring constants of the spring wires 52a, 52a of the inner peripheral side and the spring constants of the spring wires 52b, 52b of the outer peripheral side of the four spring wires 52 which support the holder, it is possible to alleviate the amount in which the objective lens 32 generates aberration against the skew of the optical disk. Hence, the deterioration of the reproduced signal can be improved.

A biaxial actuator according to a second embodiment will be described with reference to FIGS. 3 and 4.

While a biaxial actuator 61 according to the second embodiment is comprised of assemblies similar to those of the aforementioned biaxial actuator shown in FIG. 14, this biaxial actuator is constructed such that the center of the magnetic circuit is shifted.

Specifically, in the biaxial actuator 61 according to the second embodiment, the holder 33 for holding the objective lens 32 is supported to the biaxial supporting assembly 42 by four spring wires 43 serving as suspensions whose wire diameters are substantially the same. The bobbin 36 around which the tracking coil 34 and the focusing coil 35 are wound is attached to this holder 33. Then, in the second embodiment, the center of the magnetic circuit M is shifted from the bobbin 36 toward the outer peripheral side of the optical disk. The yoke 39 to which the magnet 38 of the magnetic circuit M is joined is shifted toward the outer peripheral side of the optical disk within the hollow portion of the bobbin 36, and a relationship between a space g of the inner peripheral side and a space g' of the outer peripheral side is set so as to satisfy an inequality of g>g'.

In order to shift the center of the magnetic circuit M toward the outer peripheral side, when the yoke base 37 in which the magnets 38, 38 are joined to the two inner surfaces of the yoke 39 which are formed into substantially U shape and the adjustment plate 41 to which the biaxial supporting assembly 42 for supporting the holder 33 through the four spring wires 43 is fixed are coupled and fixed by the solder s, the yoke base 37 and the adjustment plate 41 are coupled by soldering in the shifted state in such a manner that the yoke 39 is shifted within the hollow portion of the bobbin 36 attached to the holder 33 so as to establish the above spaces g, g'. In this manner, there is constructed the biaxial actuator 61 according to the second embodiment in which the center of the magnetic circuit M is shifted in the outer peripheral side.

In the biaxial actuator 61 having the above arrangement according to the second embodiment, since the center of the magnetic circuit M is shifted in the outer peripheral side, the magnetic field of the tracking coil 34 acts on the outer peripheral side of the focusing coil 35. Consequently, movement force which acts on the holder 33 is increased on the outer peripheral side by a current flowing through the coils 34, 35 in response to an error signal as compared with the inner peripheral side so that the holder 33 is not linearly moved in the height direction and is inclined when it reaches a predetermined height.

Figure 7A:
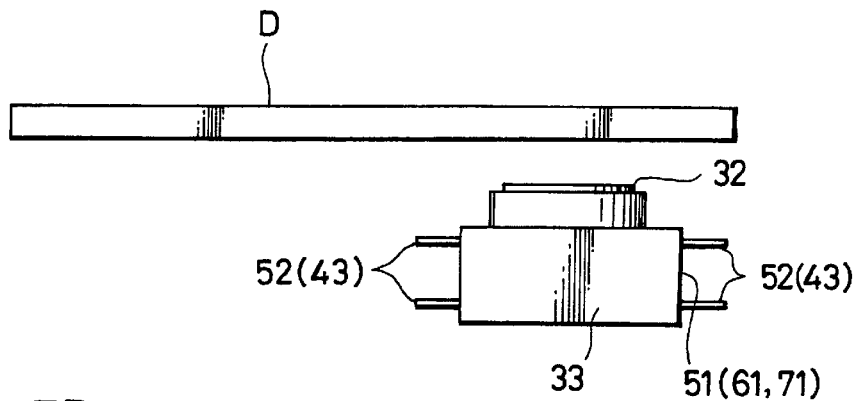
FIGS. 7A, 7B and 7C, is a diagram to which reference will be made in explaining operations of the biaxial actuator used in the present invention.
Figure 7B:
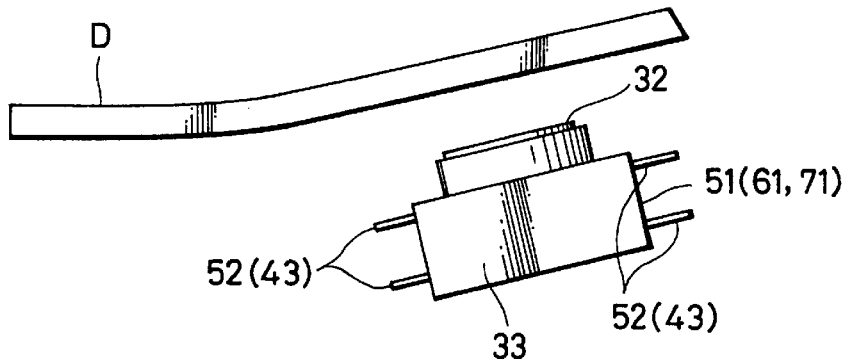

Specifically, while the holder 33 is being moved in the upper direction, since the movement force which acts on the outer peripheral side is large, the upward movement amount of the outer peripheral side becomes larger than that of the inner peripheral side and hence the holder 33 is inclined in the inner peripheral direction (see FIG. 7B). While the holder 33 is being moved in the lower direction, since the movement force which acts on the outer peripheral side is large, the downward movement of the outer peripheral side becomes larger and hence the holder 33 is inclined in the outer peripheral direction (see FIG. 7C).

In this manner, in the biaxial actuator 61 according to the second embodiment, since the holder 33 for holding the objective lens 32 is inclined in accordance with the change of the height (focus) based on a difference between the movement force of the inner peripheral side and the movement force of the outer peripheral side, the biaxial actuator 61 also can alleviate the amount in which the aberration is generated from the objective lens 32 due to the skew of the optical disk, and hence the deterioration of the reproduced signal can be improved.

Then, the biaxial actuator 61 according to the second embodiment can be realized by the simple arrangement in which the center of the magnetic circuit M is shifted in the arrangement of the illustrated existing biaxial actuator 31 and therefore becomes extremely advantageous from a cost standpoint.

Next, a biaxial actuator according to the third embodiment will be described with reference to FIGS. 5 and 6.

A biaxial actuator 71 according to the third embodiment has a modified arrangement of the biaxial actuator 61 according to the second embodiment shown in FIGS. 3 and 4 in which elasticity of the suspensions for supporting the holder 33 which holds the objective lens 32, i.e., the four spring wires 43 is changed in the inner peripheral side and in the outer peripheral side such that the holder is inclined with a certain constant inclination when the objective lens 32 reaches a determined height.

Specifically, in the biaxial actuator 71 according to the third embodiment, amounts of gel materials 72 bonded to the four spring wires 43 which support the holder 33 to the biaxial supporting assembly 42 as damping materials are changed in such a manner that elastic force generated from upper and lower spring wires $43_1$, $43_2$ of the inner peripheral side is increased and elastic force generated from upper and lower spring wires $43_3$, $43_4$ of the outer peripheral side is decreased by increasing the amounts of the gel materials 72 on the upper and lower spring wires $43_1$, $43_2$ of the inner peripheral side and by decreasing the amounts of the gel materials 72 on the upper and lower spring wires $43_3$, $43_4$ of the outer peripheral side.

In this case, the gel materials 72 of 3.5 mg are bonded to diaphragm portions $43a_1$, $43a_2$ of the base end portion with respect to the spring wires $43_1$, $43_2$ on the inner peripheral side, and the gel material of 2.0 mg are bonded to the movable portion side. On the other hand, with respect to the spring wires $43_3$, $43_4$ on the outer peripheral side, the gel materials of 0.5 mg are bonded to both of the diaphragm portions $43a_1$, $43a_4$ of the base end portion and the movable portion side. According to this embodiment, in the spring wires $43_1$, $43_2$ side on the inner peripheral side, the amount of the gel material 72 bonded to the diaphragm portion $43a_2$ of the lower side spring wire $43_2$ is larger than that of the gel material 72 bonded to the diaphragm spring portion $43a_1$ of the upper side spring wire $43_1$. Moreover, in the movable portions sides of the two upper and lower spring wires $43_1$, $43_2$, the gel materials 72 of substantially the same amount are bonded. On the other hand, in the spring wire side of the outer peripheral side, the gel materials 72 of substantially the same amount are bonded to the diaphragm spring portions $43a_3$, $43a_4$ of the two upper and lower spring wires $43_3$, $43_4$ and the two movable portion sides.

As described above, in the biaxial actuator 71 according to the third embodiment, in the arrangement in which the center of the magnetic circuit M is shifted toward the outer peripheral side similarly to the biaxial actuator 61 according to the second embodiment, i.e., in the arrangement in which the yoke 39 is shifted in the outer peripheral side of the optical disk within the hollow portion of the bobbin 36 and the relationship between the space g on the inner peripheral side and the space g' on the outer peripheral side satisfies an inequality of g>g', the amounts of the gel material 72 bonded to the four spring wires 43 ($43_1$, $43_2$, $43_3$, $43_4$) serving as the suspensions for supporting the holder 33 which holds the objective lens 32 are changed on the inner peripheral side and the outer peripheral side such that they are increased on the spring wires $43_1$, $43_2$ of the inner peripheral side and decreased on the spring wires $43_3$, $43_4$ of the outer peripheral side, whereby the magnetic fields act on the tracking coil 34 and the focusing coil 35 with a deviation on the outer peripheral side and the movement force which acts on the older 33 by the current flowing through the coils 34, 35 in response to the error signal is increased on the outer peripheral side as compared with the inner peripheral side. In addition, while the spring wires $43_1$, $43_2$ of the inner peripheral side of the spring wires 43 for supporting the holder 33 have a large amount of the gel materials 72 to be bonded and are large in elastic force, the spring wires $43_3$, $43_4$ of the outer peripheral side have a small amount of the gel materials 72 to be bonded and are therefore small in elastic force. Consequently, the holder 33 with the objective lens 32 held thereon is not linearly moved in the height direction and is inclined when it reaches a constant height.

Specifically, in the state in which the holder 33 is moved in the upper direction, since the movement force acting on the outer peripheral side is large and elastic force of the spring wires $43_3$, $43_4$ of the outer peripheral side is small, the upward movement amount of the outer peripheral side is increased as compared with that of the inner peripheral side so that the holder 33 is inclined in the inner peripheral direction. In the state in which the holder 33 is moved in the lower direction, the downward movement amount of the outer peripheral side is large so that the holder 33 is inclined in the outer peripheral direction.

As described above, since the biaxial actuator 71 according to the third embodiment is inclined in accordance with the range of the height (focus) based on the difference between the movement force acting on the inner peripheral side and the movement force acting on the outer peripheral side of the holder 33 which holds the objective lens 32 and the difference between the elastic force of the inner peripheral side spring wires $43_1$, $43_2$ and the elastic force of the outer peripheral side spring wires $43_3$ and $43_4$ of the four spring wires 43 serving as the suspensions for supporting the holder 33, this biaxial actuator 71 can alleviate the amount of the aberration generated by the objective lens 32 due to the skew of the optical disk and can improve the deterioration of the reproduced signal. The biaxial actuator 71 according to the third embodiment can be inclined more reliably as compared with the aforementioned biaxial actuator 51, 61 according to the first and second embodiments.

Then, the biaxial actuator 71 according to the third embodiment can be realized by the simple arrangement in which the center of the magnetic circuit M is shifted and the bonding amounts of the gel materials 72 as the damping materials to the spring wires 43 ($43_1$, $43_2$, $43_3$, $43_4$) serving as the suspensions are changed in the arrangement of the prior-art biaxial actuator 31 shown in FIG. 14.

Further, the aforementioned biaxial actuator 51 according to the first embodiment and the aforementioned biaxial actuator 61 according to the second embodiment can be combined with each other.

Specifically, with respect to the four spring wires serving as the suspension for supporting the holder which holds the objective lens, the inner peripheral side spring wires may be comprised of spring wires having a large spring constant and the outer peripheral side spring wires may be comprised of spring wires having a small spring constant and the yoke of the magnetic circuit M may be shifted in the outer peripheral side and inserted into the bobbin around which the tracking coil and the focusing coil are wound and which is attached to the holder. Also in this case, this biaxial actuator can be operated equally and achieve similar effects as the biaxial actuator 71 of the aforementioned third embodiment.

The biaxial actuators 51, 61 and 71 having the above arrangements according to the respective embodiments are operated in response to the deformation of the optical disk D as shown in FIG. 7.

Specifically, FIG. 7A shows the case in which the optical disk D is placed in the normal, flat state. The holder 33 for holding the objective lens 32, which is the movable portion of the biaxial actuators 51, 61 and 71 (and to which the bobbin 36 around which the tracking coil 34 and the focusing coil 35 are wound is attached) is horizontally supported on the biaxial supporting assembly 42 through the four spring wires 52 or 43 serving as the suspensions and the optical axis of the objective lens 32 is made perpendicular to the signal recording surface of the optical disk D and the objective lens can normally read out the recorded signal from the optical disk.

FIG. 7B shows the case in which the optical disk D is skewed. In this state, the holder 33 which is the movable portion of the biaxial actuators 51, 61 and 71 is moved in the upper direction by the current which flows through the focusing coil 35 when the skew and the deformation of the optical disk D are detected. Since the holder 33 is moved in the upper direction, the respective biaxial actuators 51, 61 and 71 are inclined by a certain inclination when they reach a certain height by the above mechanism. Specifically, the objective lens 32 held on the older 33 approaches to the angle at which the optical axis of the objective lens becomes peripheral to the optical disk D which is inclined and skewed such that the outer peripheral side is elevated by the amount corresponding to the change of the height when the holder is moved in the upper direction, whereby the amount of the generated aberration can be alleviated, and the recorded signal can be read out from the optical disk in the best condition.

Figure 7C:
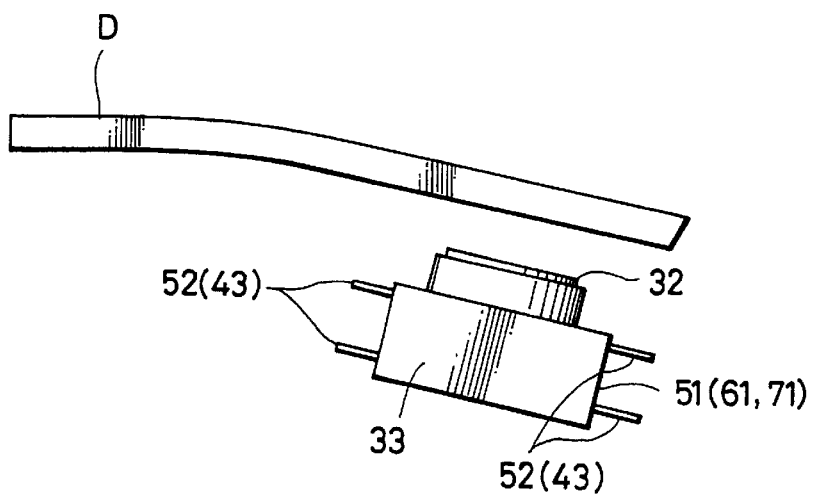

FIG. 7C shows the case in which the optical disk D is skewed in the direction opposite to the direction in which the optical disk is skewed, i.e., the case in which the optical disk D is deformed in a dome-like fashion. In this state, the holder 33 which is the movable portion of the biaxial actuator 51, 61 and 71 is moved in the lower direction by a current which flows through the focusing coil 35 in the opposite direction when the skew and the deformation of the optical disk D are detected. When the holder 33 is moved in the lower direction, the respective biaxial actuators 51, 61 and 71 are inclined by the aforementioned mechanism in such a manner that the outer peripheral side is descended by the amount corresponding to the change of the height. Consequently, the objective lens 32 held on the holder 33 approaches to the angle at which the optical axis thereof becomes peripheral to the skewed optical disk D, whereby the amount of the generated aberrations can be alleviated and the recorded signal can be read out in the best condition.

Figure 8:
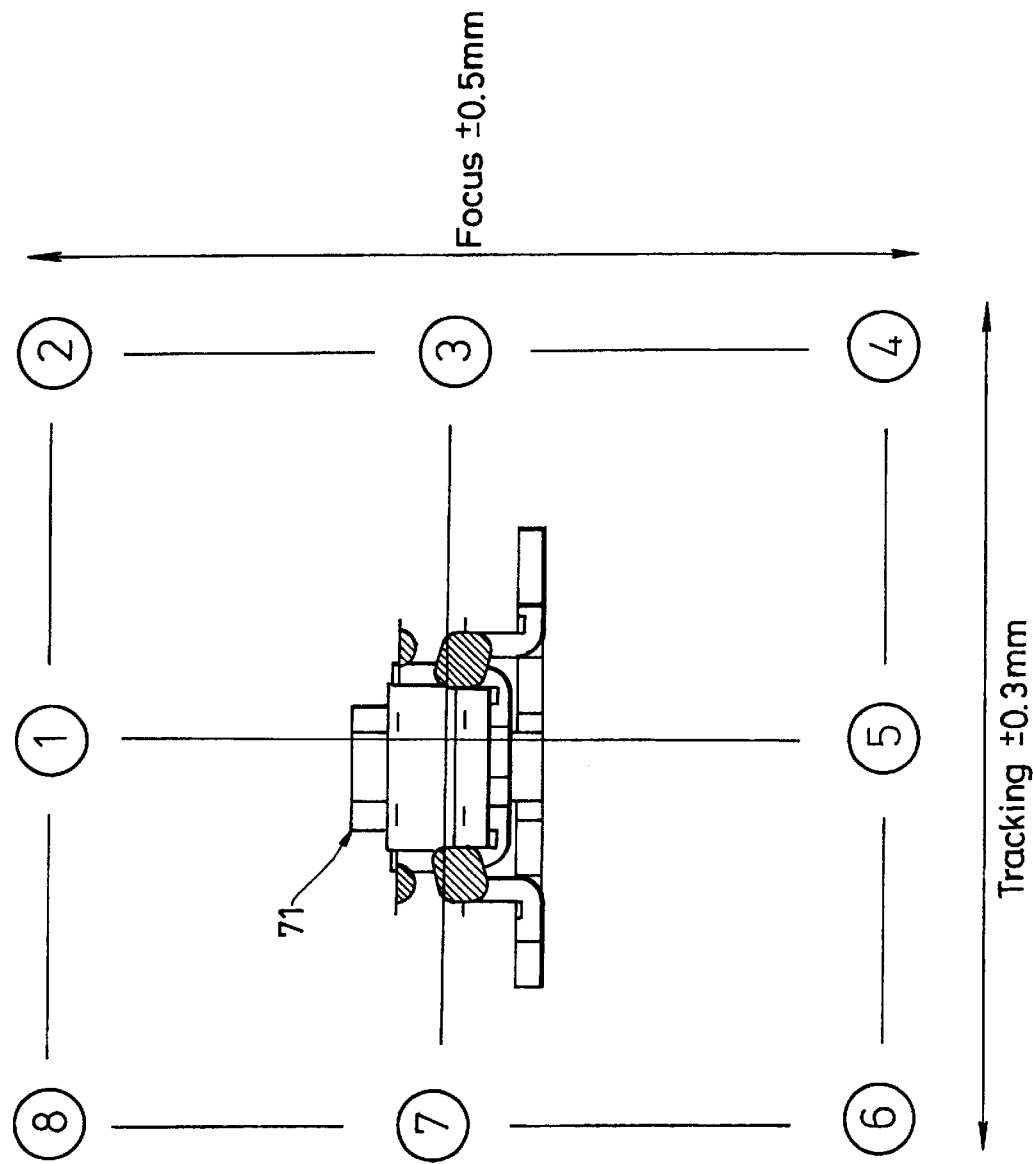
FIG. 8 is an explanatory diagram showing measuring points used when skews of the biaxial actuator used in the present invention are measured.

Skews of the biaxial actuator 71 having the above arrangement according to the third embodiment were evaluated by an eight-point measuring method shown in FIG. 8.

Specifically, by energizing the tracking coil 34 and the focusing coil 35, the biaxial actuator 71 was operated in the sequential order of points ① to ⑧ in FIG. 8 along the guaranteed stroke range (tracking ±0.3 mm, focusing ±0.5 mm). Then, the neutral position was set to the point 0, inclinations from the point 0 were measured by an auto collimator and differences from the neutral position, i.e., point 0 were evaluated as skews.

Figure 10:
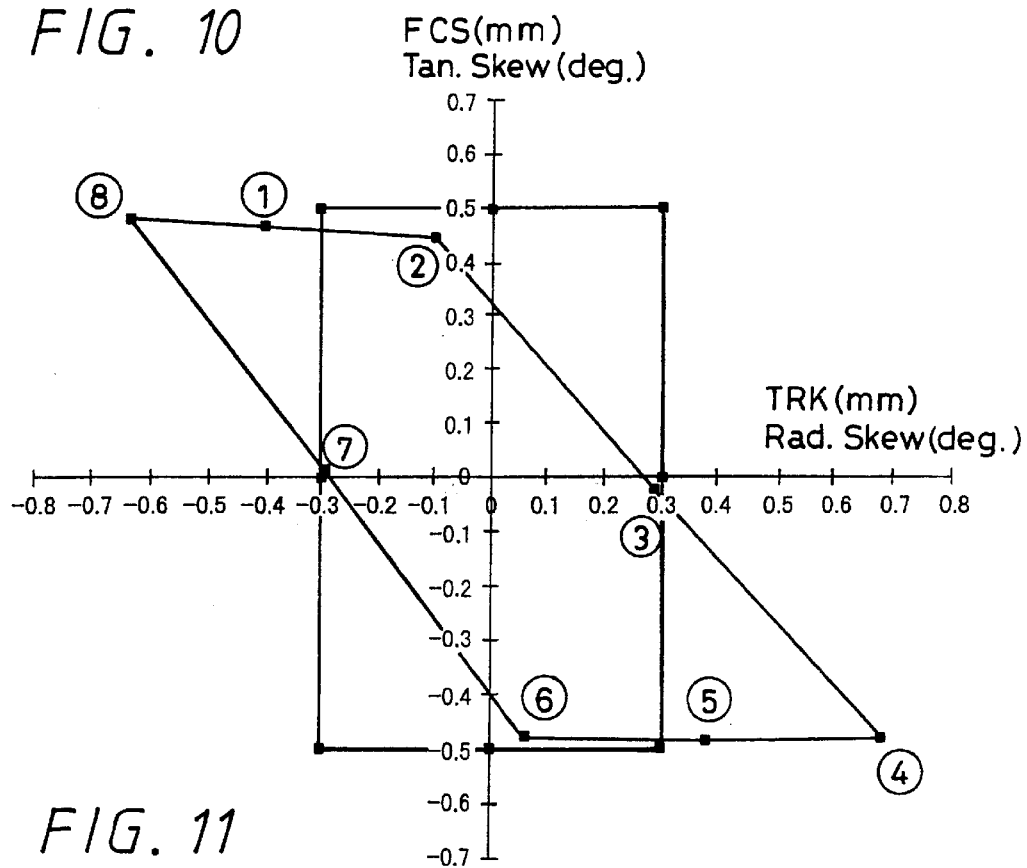
FIG. 10 is characteristic graph of skews measured at the skew measuring points shown in FIG. 8.

Measured results are schematically shown in FIG. 10 as a table. In this table, a rectangular-shaped display shows a stroke range of focus ±0.5 mm and tracking of ±0.3 mm and the case in which the skew is zero.

|  | Focus | Tracking | Neutral position |
|---|---|---|---|
| Point 0 | 0 mm | 0 mm |  |
| Point 1 | 0.5 mm | 0 mm |  |
| Point 2 | 0.5 mm | 0.3 mm |  |
| Point 3 | 0 mm | 0.3 mm |  |
| Point 4 | −0.5 mm | 0.3 mm |  |
| Point 5 | −0.5 mm | 0 mm |  |
| Point 6 | −0.5 mm | −0.3 mm |  |
| Point 7 | 0 mm | −0.3 mm |  |
| Point 8 | 0.5 mm | 0.5 mm | −0.3 mm |

The focus plus direction is the direction in which the biaxial actuator approaches to the optical disk, and the tracking plus direction is the right-hand direction seen from the fixed-member side of the biaxial actuator.

Then, a substantially parallelogram-shaped display shows skews of the biaxial actuator obtained when skews were measured at eight points. Vectors formed by connecting four intersection points between four corner points of the rectangular-shaped display and XY axes and the respective measured points ① to ⑧ of substantially the parallelogram-shaped display represent skews.

Here, a radial skew plus direction is defined as a skew inclined in the tracking plus direction, and a tangential skew plus direction is defined as a skew in which the objective lens position is inclined to the biaxial actuator drive section.

FIG. 9 shows skew measured values of the eight points of the biaxial actuator in actual practice. When the skew measured values of these respective points are written in the schematic diagram shown in FIG. 10 and the measured values of the points ① to ⑧ are sequentially connected, there is obtained substantially a parallelogram-like display which shows the skews of the biaxial actuator in actual practice.

Next, there will be contrasted jitter values of the optical pickup apparatus including the biaxial actuator having the above arrangement and the existing optical pickup apparatus in which the tilt is adjusted by the tilt adjustment mechanism. As the biaxial actuators according to the embodiments of the present invention, there is used the biaxial actuator 71 according to the third embodiment shown in FIG. 5 and FIG. 6.

Figure 15:
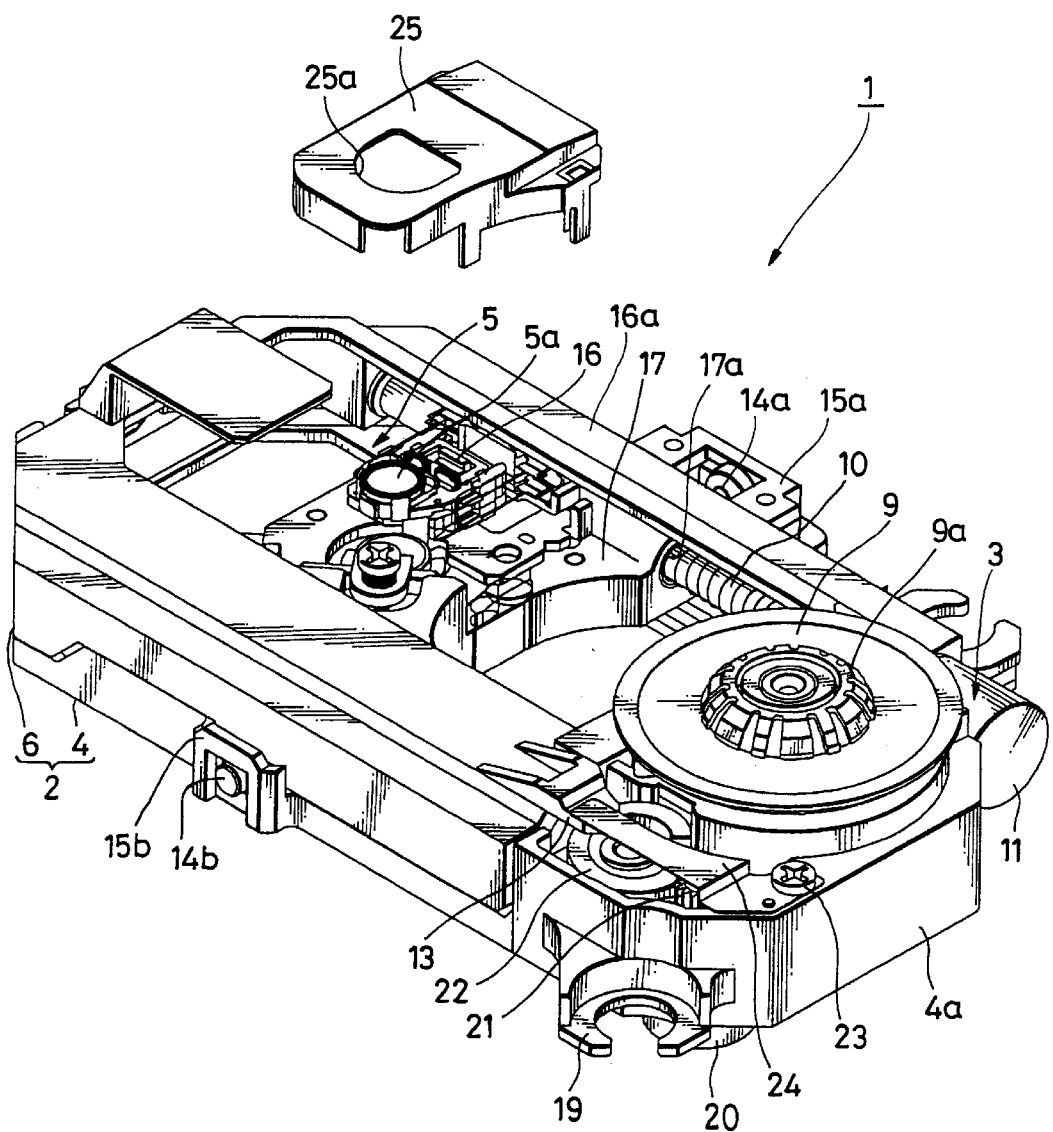
FIG. 15 is a perspective view showing the existing disk drive apparatus with its biaxial cover being disassembled.
Figure 16:
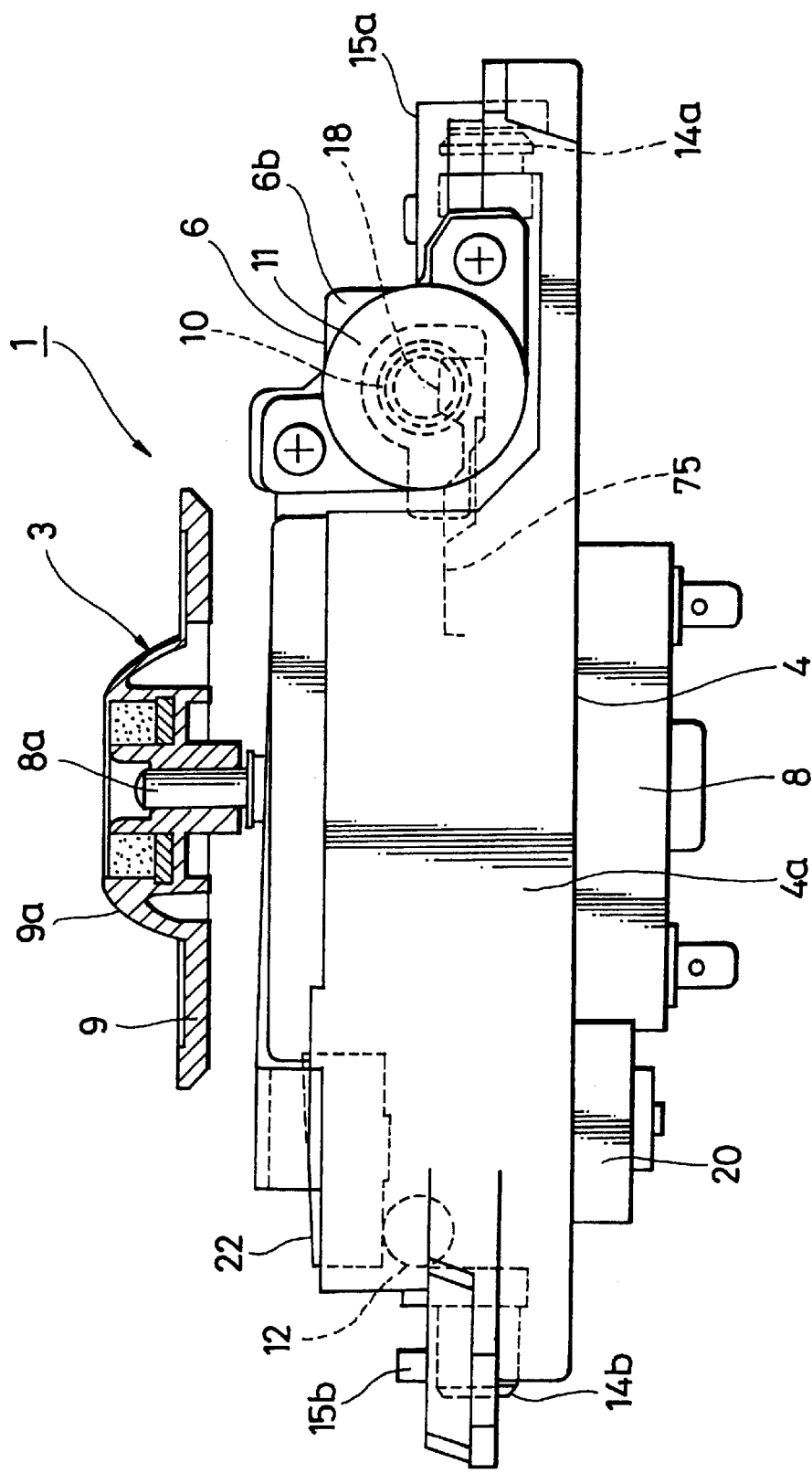
FIG. 16 is a front view of the disk drive apparatus shown in FIG. 15 with its turntable being cut-away.
Figure 17:
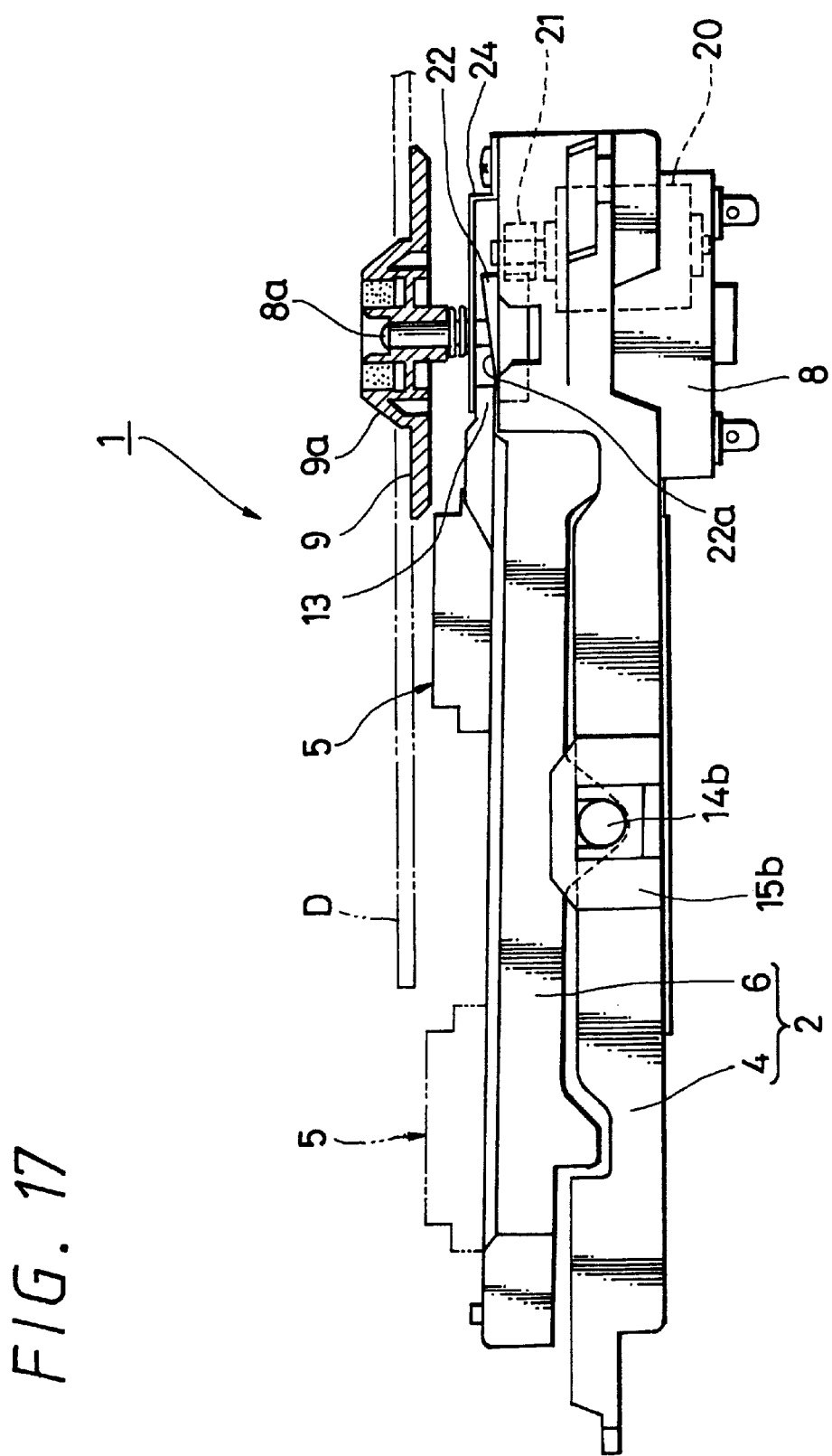
FIG. 17 is a side view showing the disk drive apparatus shown in FIG. 15 with its pickup chassis being tilted forward.
Figure 18:
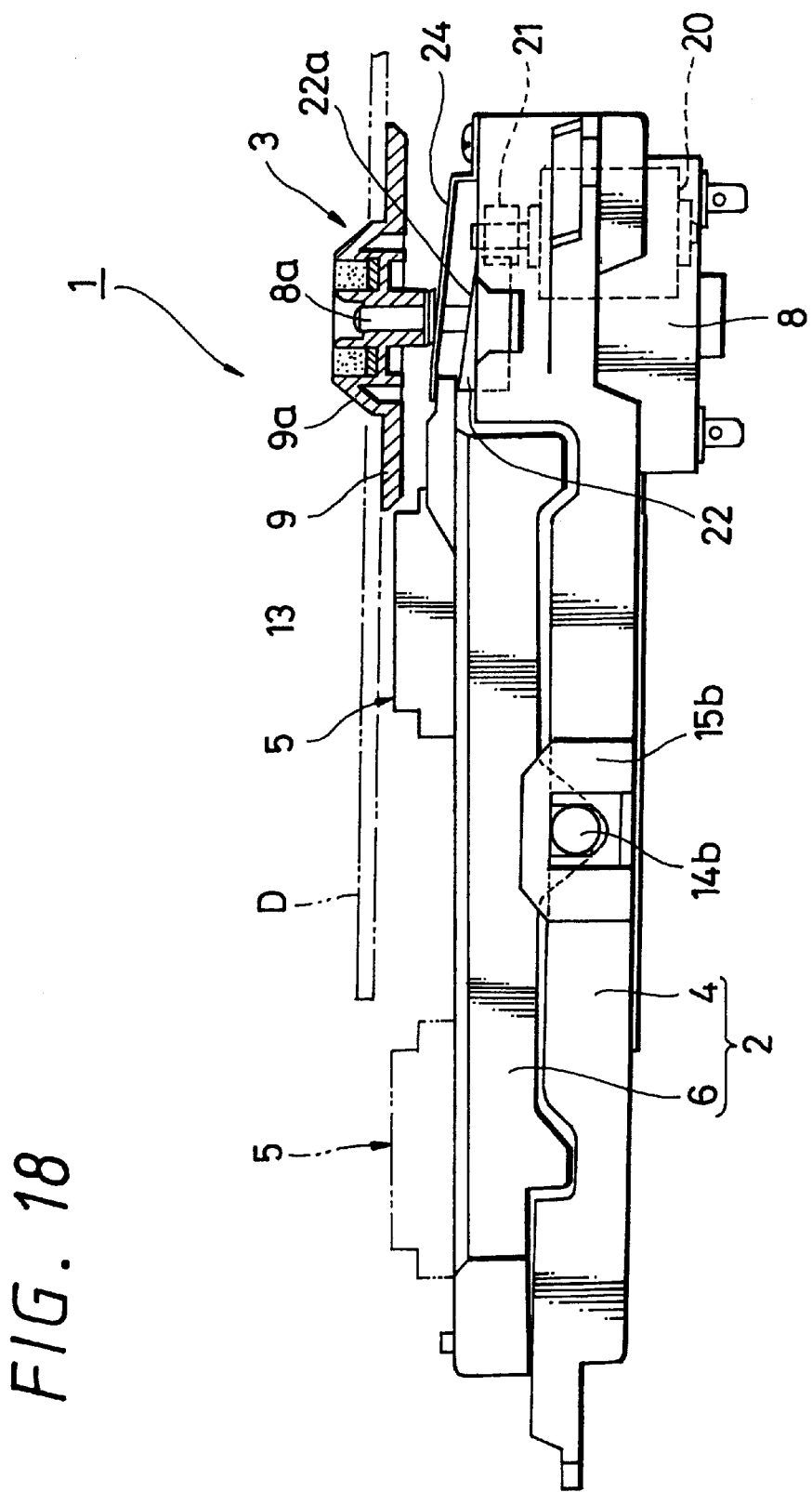
FIG. 18 is a side view showing the disk drive apparatus shown in FIG. 15 with its pickup chassis being tilted backward.

As the biaxial actuator 71, there are manufactured a biaxial actuator which is set to be inclined by ±0.2° in response to the change of the height of ±0.5 mm, a biaxial actuator which is set to be inclined by ±0.25°, a biaxial actuator which is set to be inclined by ±0.3°, a biaxial actuator which is set to be inclined by ±0.4° and a biaxial actuator which set to be inclined by ±0.5°, respectively. The five optical pickup devices including these respective biaxial actuators and the optical pickup device of the aforementioned existing optical disk apparatus 1 shown in FIG. 15 are contrasted with each other.

Then, this contrast was carried out by using a normal disk a, a disk b in which a skew angle is −0.45°, a disk c in which a skew angle is −0.67°, a disk d in which a skew angle is −0.4°, a disk e in which a skew angle is −0.55°, a disk f in which a skew angle is −0.73° and a disk g in which a skew angle is +0.45° as sample optical disks.

Figure 11:
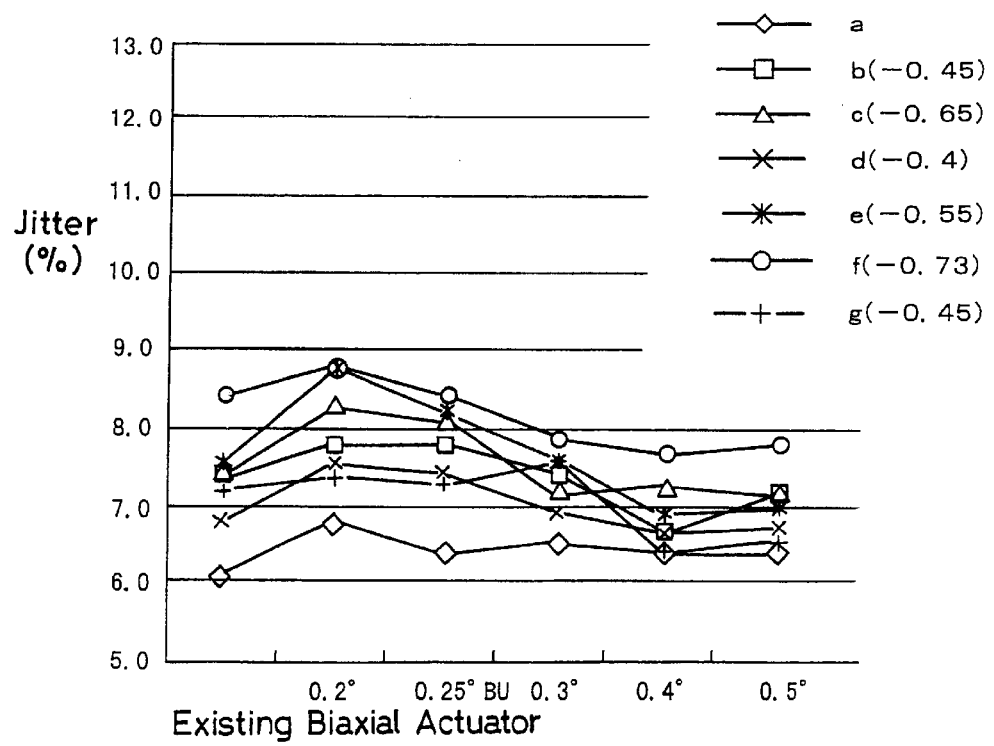
FIG. 11 is a diagram for comparing optimum jitter values obtained from respective optical disks by the biaxial actuator used in the present invention and the existing biaxial actuator.
Figure 12:
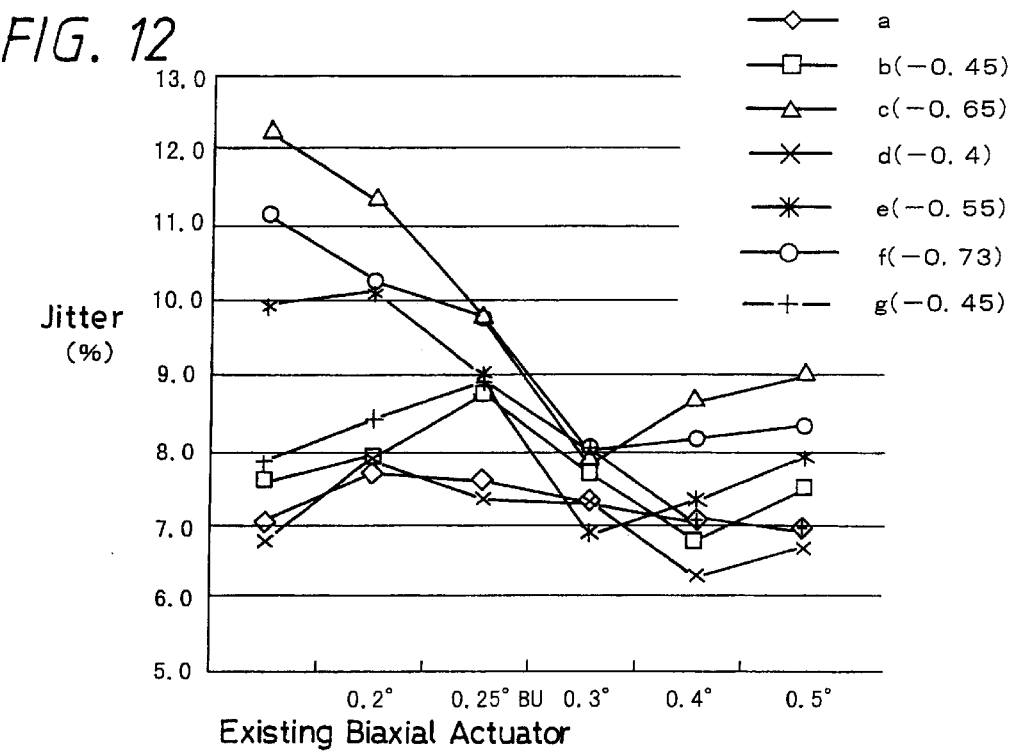
FIG. 12 is a diagram for comparing jitter values obtained from the outermost peripheries of the respective optical disks by the biaxial actuator used in the present invention and the existing biaxial actuator.
Figure 13:
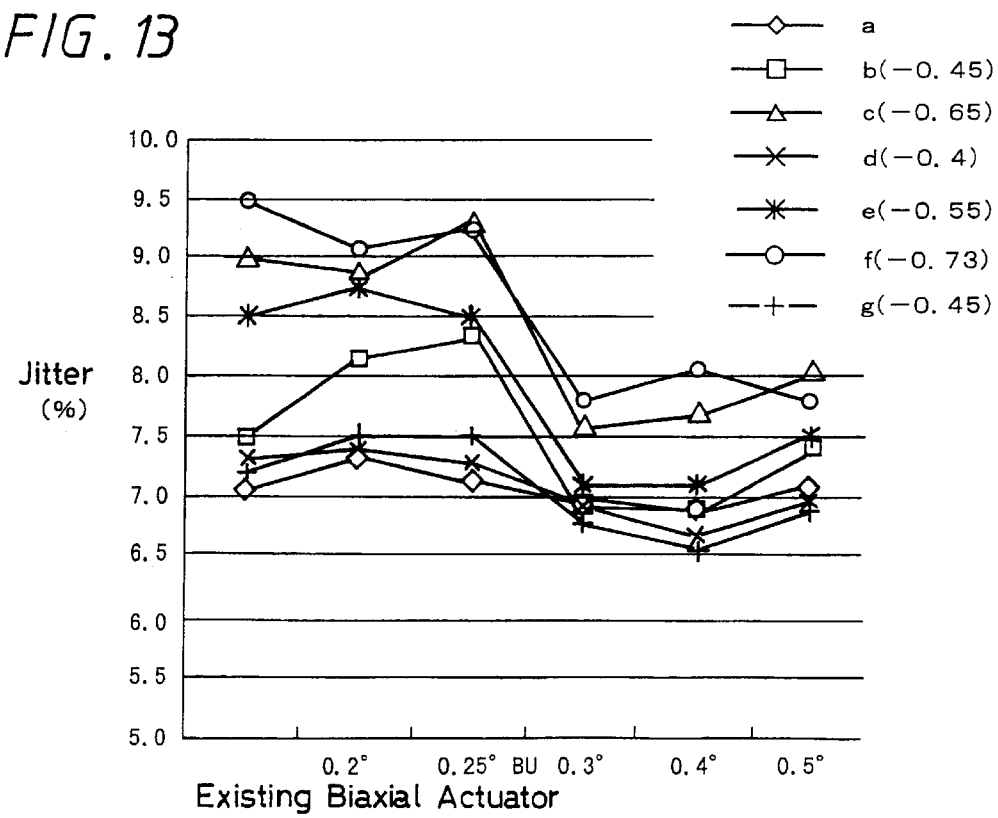
FIG. 13 is a diagram for comparing jitter values obtained from the innermost peripheries of the respective optical disks by the biaxial actuator used in the present invention and the existing biaxial actuator.

By these contrasts, there were obtained results shown in FIGS. 11, 12 and 13.

FIG. 11 shows measured values of the best adaptive values of the respective optical disks a to f obtained when the respective optical pickup devices were adjusted relative to the respective optical disks a to g with the tilt best point, i.e., jitter minimum value by the tilt adjustment mechanism.

As described above, when the respective optical pickup devices were adjusted in tilt by the tilt adjustment mechanism, the jitter values in the respective optical disks a to g become substantially constant values within a range of 6.0% to 9.0%.

FIG. 12 shows measured values of jitter values obtained at the outermost peripheries of the respective optical disks a to f when the respective optical pickup devices are not adjusted in tilt relative to the respective optical disks a to g.

As described above, while the existing optical pickup device has jitter values which fall within a range of 10% to 13% in the case of the optical disk c, f, e having large skew angles, the optical pickup devices in which the tilt is corrected by the biaxial actuator according to the present invention decrease jitter values, i.e., in the biaxial actuator which is set to be inclined by ±0.3° in response to the change of the height of ±0.5 mm, in the biaxial actuator which is set to be inclined by ±0.4° and in the biaxial actuator which is set to be inclined by ±0.5°, the jitter values relative to the respective optical disks a to g, jitter values fall within a range of 6.0% to 9.0%.

These jitter values are substantially the same as those obtained when the optical pickup device was adjusted in tilt by the tilt adjustment mechanism as mentioned before. In particular, the optical pickup device in which the biaxial actuator itself is set to be inclined by ±0.3° in response to the change of the height of ±0.5 mm had obtained the most satisfactory jitter value.

FIG. 13 shows measured value of jitter values obtained in the innermost peripheries of the respective optical disks a to f when the respective optical pickup devices are not adjusted in tilt relative to the respective optical disks a to g by the tilt adjustment mechanism.

Also in this case, while the existing optical pickup device has the jitter values which fall within a range of 8.5% to 9.5% with respect to the optical disks f, c, e having the large skew angles, the optical pickup devices in which the biaxial actuator itself according to the present invention is corrected in tilt can lower the jitter values, i.e., in the biaxial actuator which is set to be inclined by ±0.3° in response to the change of the height of ±0.5°, in the biaxial actuator which is to be inclined by ±0.4° and in the biaxial actuator which is set to be inclined by ±0.5°, the jitter values in the respective optical disks a to g fall within a range of 6.5% to 8.0%. In particular, the optical pickup device in which the biaxial actuator itself is set to be inclined by ±0.3° in response to the change of the height of ±0.5 mm had obtained the most satisfactory jitter value within a range of 6.8 to 7.8%.

As described above, the optical pickup device having the arrangement in which the biaxial actuator itself according to the present invention is inclined by a certain constant angle when it reaches a certain constant height, i.e., the optical pickup device in which the inclination of the biaxial actuator is set in a range of 0.3 deg/0.5 mm to 0.4 deg/0.5 mm can demonstrate performance of substantially the same skew absorption on the outer peripheral side of the optical disk by the existing optical pickup device which is adjusted in tilt by the tilt mechanism.

Since the optical pickup device according to the present invention effectively utilizes the change of the focus height due to the skew on the outer periphery of the optical disk, although the effects on the inner peripheral side in which the change of the focus height is small cannot be expected so much as in the outer peripheral side, a tilt is corrected a little.

In the existing optical pickup device in which the tilt is adjusted by the tilt mechanism, assuming that there is a small probability that there will be disks which are extremely skewed on the inner peripheral side, then skewed amounts of all skewed disks are represented by the skewed amount of the inner periphery and the adaptive operation is executed. A study of past actual results reveals that the insufficient tilt adaptive operation on the inner peripheral side of the disk never interferes with the reproduction of the optical disk. From this point of view, since it can be judged that a tilt correction, which is substantially equal to a tilt correction on the outer peripheral side, is not required on the inner peripheral side of the optical disk, the optical pickup device according to the present invention can alleviate the amount of the generated aberrations by correcting the tilt on the outer peripheral side of the optical disk.

While the embodiments of the present invention have been described so far, the present invention is not limited to the above embodiments and can be variously modified without departing from the gist of the present invention.

For example, as the optical pickup device, there can be used a biaxial actuator of a shaft slide rotary type. Since this biaxial actuator has an arrangement in which a tracking coil and a focusing coil are wound around a cylindrical bobbin which is a drive section for holding an objective lens and a magnet is provided in the outside, if the structure of the magnet is changed, then a magnetic circuit will be changed. In this case, the central axis itself is curved and the drive section is slid along this central axis such that the biaxial actuator is inclined by a certain constant inclination when it reaches a certain constant height. In this arrangement, the rotation center of the bobbin and the center of the curved central axis are made coincident with each other. In this arrangement, if the slide surface between the bobbin and the central axis is set to only the upper and lower end portions of the bobbin, then even though the central axis is curved, the bobbin can freely be moved in the upper and lower direction along the central axis.

The shapes, sizes and the like of the constituent members in the above respective embodiments can be varied properly.

Then, the optical pickup device according to the present invention can be combined with a magnetic head device for generating an external magnetic field and thereby can be used to record and reproduce on and from a magneto-optical disk.

As described above, since the optical pickup device according to the present invention has the arrangement in which the movable-side portion of the objective lens drive mechanism for driving the objective lens in the tracking direction and the focusing direction is inclined by a predetermined inclination such that the optical axis of the objective lens becomes perpendicular to the signal recording surface of the optical disk in response to the change of focusing height due to the skew of an optical disk, the optical pickup device can record and/reproduce the recorded signal reliably. Since the tilt mechanism for adjusting the tilt by detecting the skew of the optical disk can be deleted from the optical pickup device, the disk drive apparatus can be simplified in arrangement, the number of assemblies can be reduced, and it becomes possible to decrease the cost.

Then, according to the present invention, the spring constant of the supporting member for supporting the movable-side member of the objective lens drive mechanism which drives the objective lens is increased on the inner peripheral side and is decreased on the outer peripheral side of the optical disk. Further, the center of the magnetic circuit for driving the movable-side member of the objective lens drive mechanism is shifted to the outer peripheral direction of the optical disk. Further, the center of the magnetic circuit is shifted as described above, and the amount of the damping materials bonded to the supporting member is increased on the supporting member of the inner peripheral side relative to the optical disk and is decreased on the supporting member of the outer peripheral side. Thus, special mechanism and members need not be added to the existing biaxial actuator, and by the extremely simple arrangement, the movable portion for holding the objective lens can be inclined by the predetermined inclination corresponding to the skewed and deformed optical disk in response to the change of the focus height. Therefore, the RF signal can reliably be read out from the skewed and deformed optical disk with a sufficient jitter amount.

Having described preferred embodiments of the present invention with reference to the accompanying drawings, it is to be understood that the present invention is not limited to the above-mentioned embodiments and that various changes and modifications can be effected therein by one skilled in the art without departing from the spirit and scope of the present invention as defined in the appended claims.

What is claimed is:

1. An optical pickup device including an objective lens drive mechanism comprising:

a movable-side member for holding an objective lens for converging optical beams emitted from a light source on a signal recording surface of a disk-like optical recording medium, means for supporting said movable-side member such that said movable-side member can be driven in the focusing direction and in the tracking direction relative to said disk-like optical recording medium, and drive force providing means for providing said movable-side member with driving force, wherein said movable-side member is driven with a predetermined inclination in the focusing direction in response to a focusing height changed due to a skew of said disk-like optical recording medium in such a manner that an optical axis direction of said objective lens becomes substantially perpendicular to the signal recording surface of said disk-like optical recording medium, said supporting means including a plurality of springs with spring constants located at an inner peripheral side larger than spring constants of a plurality of springs at said outer peripheral side for generating said predetermined inclination.

2. An optical pickup device including an objective lens drive mechanism comprising a movable-side member for holding an objective lens for converging optical beams emitted from a light source on a signal recording surface of a disk-like optical recording medium, a supporting mechanism for supporting said movable-side member such that said movable-side member can be driven in the focusing direction and in the tracking direction relative to said disk-like optical recording medium and drive force providing means for providing said movable-side member with driving force, wherein said movable-side member is driven with a predetermined inclination in the focusing direction in response to a focusing height changed due to a skew of said disk-like optical recording medium in such a manner that an optical axis direction of said objective lens becomes substantially perpendicular to the signal recording surface of said disk-like optical recording medium, and wherein said supporting mechanism is comprised of a fixed-side member and supporting springs, and spring constants of supporting springs located at the inner peripheral side of said disk-like optical recording medium are larger than those of supporting springs located at the outer peripheral side so that said predetermined inclination is generated when said movable-side member is driven in the focusing direction.

3. An optical pickup device according to claim 2, wherein said supporting springs have spring constants of supporting springs of said inner peripheral side larger than those of supporting springs of said outer peripheral side by differing diameters of wires.

4. An optical pickup device including an objective lens drive mechanism comprising a movable-side member for holding an objective lens for converging optical beams emitted from a light source on a signal recording surface of a disk-like optical recording medium, a supporting mechanism for supporting said movable-side member such that said movable-side member can be driven in the focusing direction and in the tracking direction relative to said disk-like optical recording medium and drive force providing means for providing said movable-side member with driving force, wherein said movable-side member is driven with a predetermined inclination in the focusing direction in response to a focusing height changed due to a skew of said disk-like optical recording medium in such a manner that an optical axis direction of said objective lens becomes substantially perpendicular to the signal recording surface of said disk-like optical recording medium, and wherein said driving mechanism includes a magnetic circuit and a center of said magnetic circuit is shifted in the outer peripheral direction relative to said disk-like optical recording medium such that said predetermined inclination is generated when said movable-side member is driven in the focusing direction, and wherein said magnetic circuit shifts its center in the outer peripheral side by increasing a space between a yoke fitted into a hollow portion of a focusing coil wound around said movable-side member and said focusing coil in the inner peripheral side relative to said disk-like optical recording medium and by decreasing said space in the outer peripheral side relative to said disk-like optical recording medium.

5. An optical pickup device including an objective lens drive mechanism comprising a movable-side member for holding an objective lens for converging optical beams emitted from a light source on a signal recording surface of a disk-like optical recording medium, a supporting mechanism for supporting said movable-side member such that said movable-side member can be driven in the focusing direction and in the tracking direction relative to said disk-like optical recording medium and drive force providing means for providing said movable-side member with driving force, wherein said movable-side member is driven with a predetermined inclination in the focusing direction in response to a focusing height changed due to a skew of said disk-like optical recording medium in such a manner that an optical axis direction of said objective lens becomes substantially perpendicular to the signal recording surface of said disk-like optical recording medium, and wherein said driving mechanism includes a magnetic circuit, said magnetic circuit has a center shifted in the outer peripheral direction relative to said disk-like optical recording medium, said supporting mechanism is comprised of a fixed-side member and four supporting springs and said predetermined inclination is generated by suppressing elastic force of supporting springs located at the inner peripheral side relative to said disk-like optical recording medium when said movable member is driven in the focusing direction.

6. An optical pickup device according to claim 5, wherein said magnetic circuit shifts its center in the outer peripheral side by increasing a space between a yoke fitted into a hollow portion of a focusing coil wound around said movable-side member and said focusing coil in the inner peripheral side relative to said disk-like optical recording medium and by decreasing said space in the outer peripheral side relative to said disk-like optical recording medium, said supporting mechanism includes four supporting springs to which damping materials are bonded and elastic force of supporting springs located at said inner peripheral side is suppressed by increasing an amount of damping materials of said supporting springs located at the inner peripheral side relative to said disk-like optical recording medium than that of damping materials of said supporting springs located at the outer peripheral side.

7. An optical pickup device including an objective lens drive mechanism comprising:

a movable-side member for holding an objective lens for converging optical beams emitted from a light source on a signal recording surface of a disk-like optical recording medium, a supporting mechanism for supporting said movable-side member such that said movable-side member can be driven in the focusing direction and in the tracking direction relative to said disk-like optical recording medium, and drive force providing means for providing said movable-side member with driving force, wherein said movable-side member is driven with a predetermined inclination in the focusing direction in response to a focusing height changed due to a skew of said disk-like optical recording medium in such a manner that an optical axis direction of said objective lens becomes substantially perpendicular to the signal recording surface of said disk-like optical recording medium, wherein said supporting mechanism includes a plurality of supporting springs, each having a spring constant, located at an inner peripheral side and an outer peripheral side of said disk-like optical recording medium, the inner-side supporting springs having spring constants larger than those of supporting springs located at the outer peripheral side so that said predetermined inclination is generated when said moveable-side member is driven in the focusing direction.

8. The optical pickup device according to claim 7, wherein said spring constants of supporting springs of said inner peripheral side are larger than those of supporting springs of said outer peripheral side because of diameters of wires for said springs.

* * * * *